Figure 15:
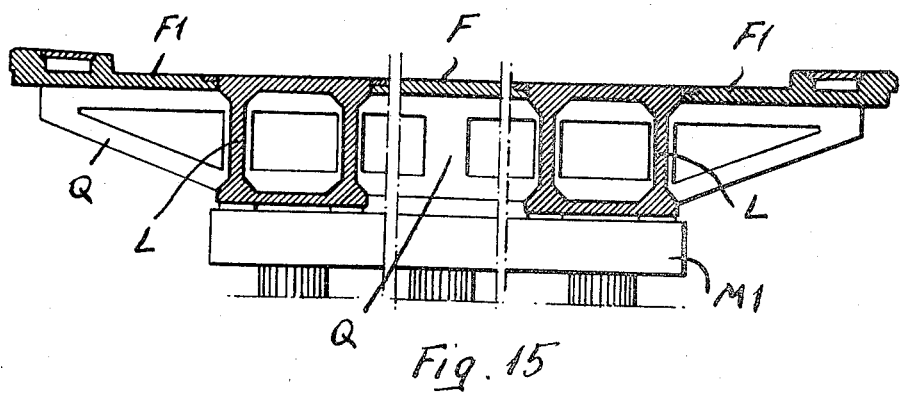
Figure 16:
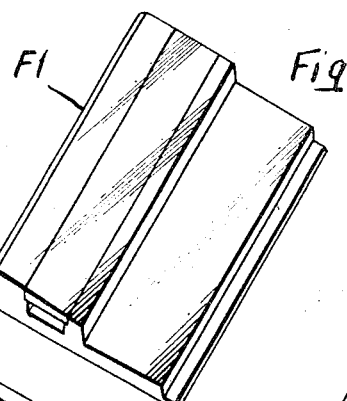
Figure 17:
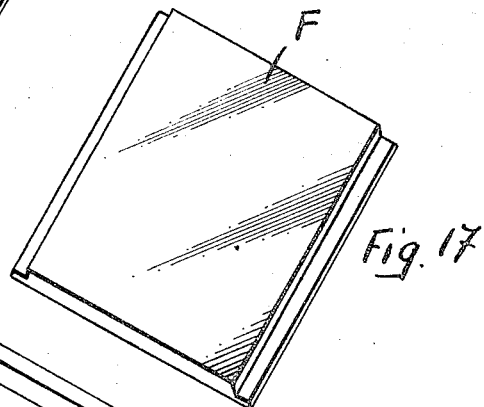
Figure 18:
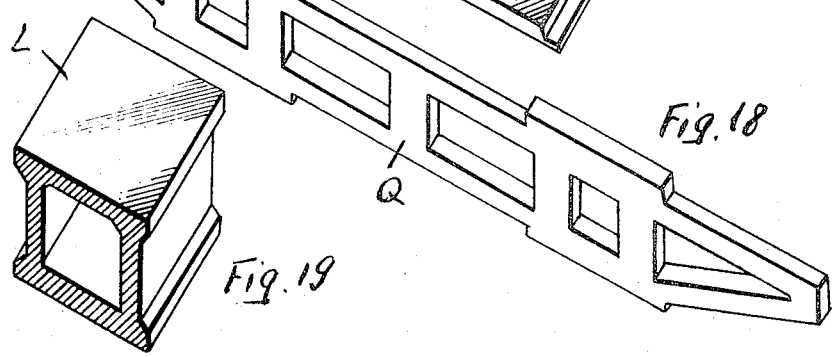
Figure 19:
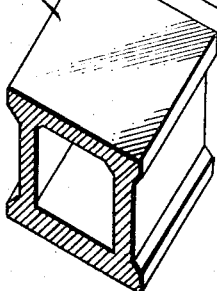

Feb. 6, 1968  F. VANICH  3,367,074
METHOD FOR ERECTING PREFABRICATED BRIDGES OF CONCRETE, AND
BRIDGE ERECTED BY SAID METHOD
Filed March 17, 1964                                     5 Sheets-Sheet 1
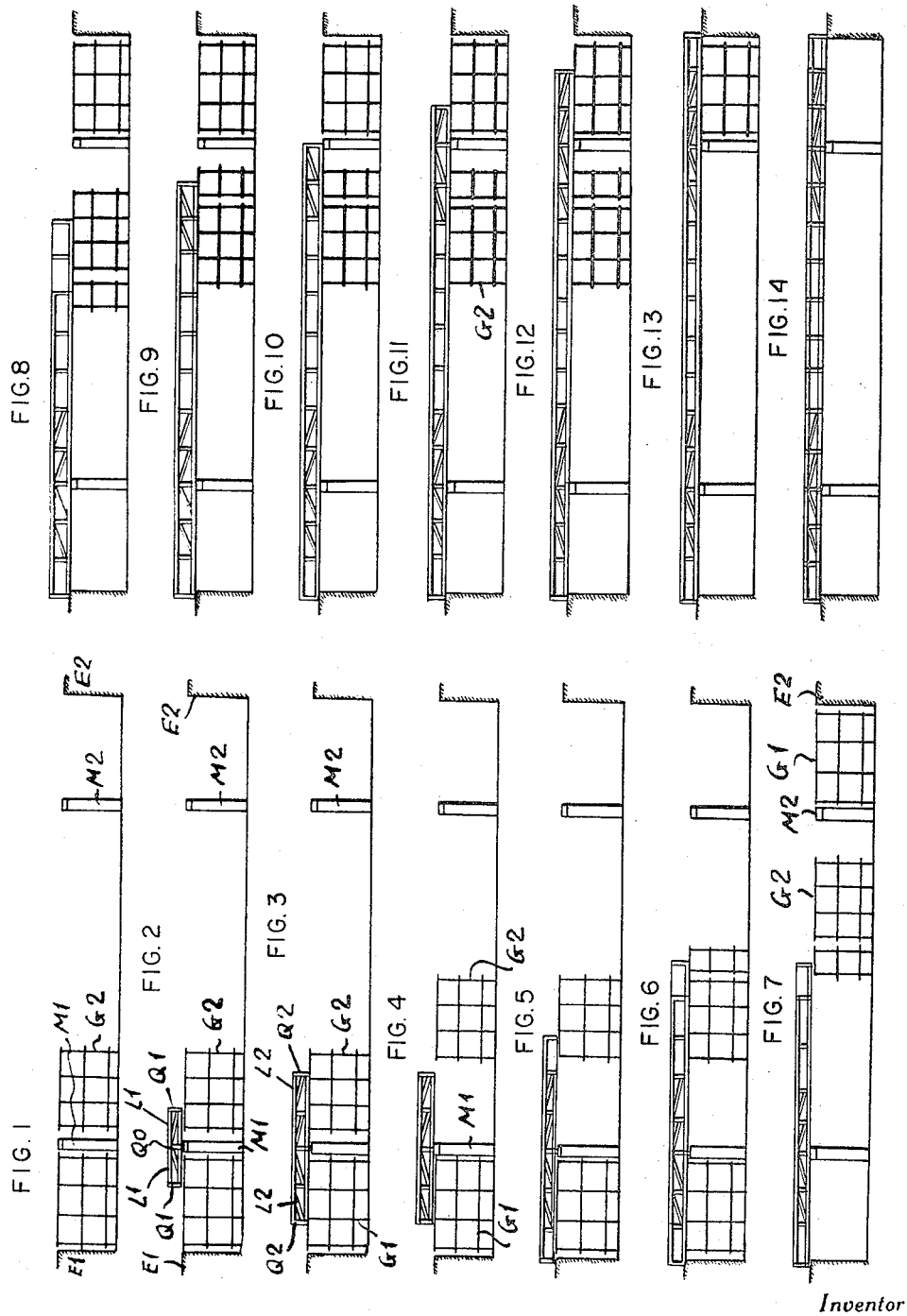
Inventor
FRANCESCO VANICH
By [signature]
Attorneys Inventor
FRANCESCO VANICH

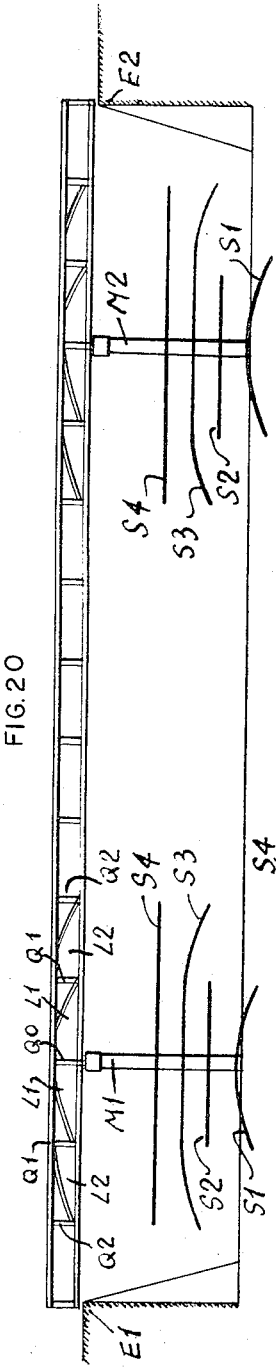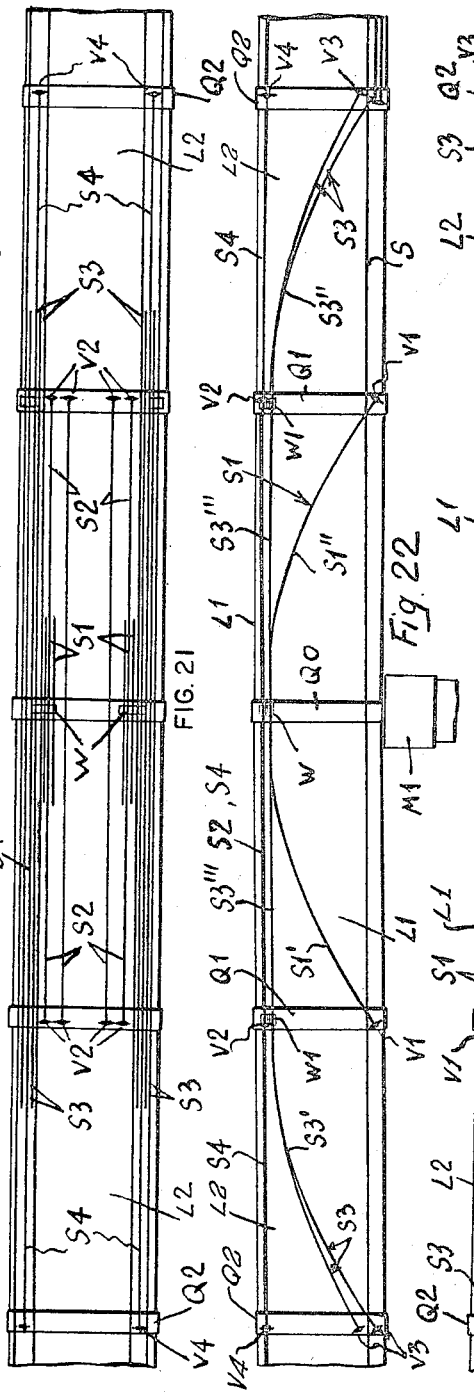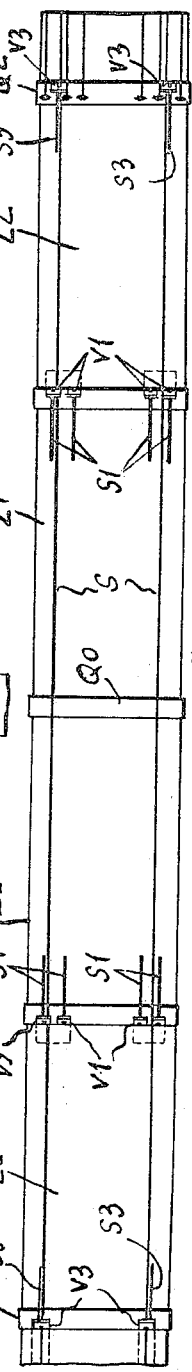

Feb. 6, 1968 F. VANICH 3,367,074
METHOD FOR ERECTING PREFABRICATED BRIDGES OF CONCRETE, AND
BRIDGE ERECTED BY SAID METHOD
Filed March 17, 1964 5 Sheets-Sheet 4
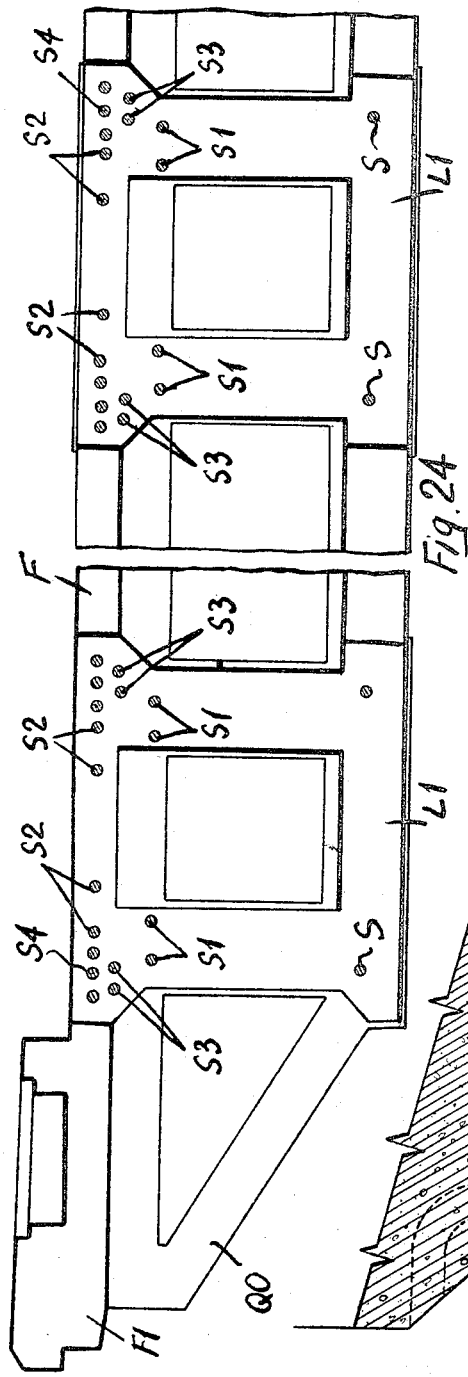
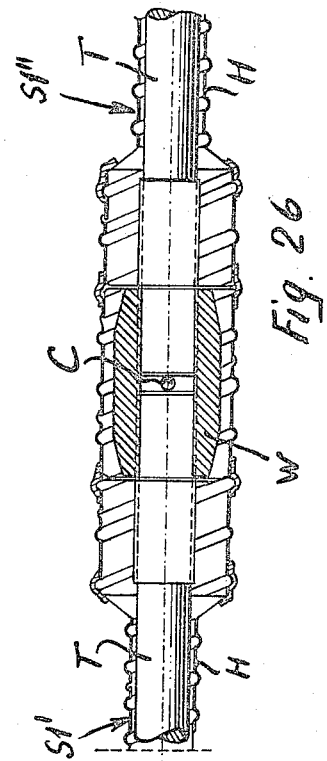
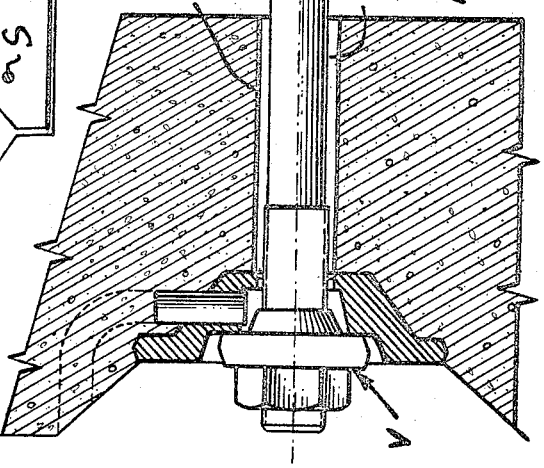
Inventor
FRANCESCO VANICH
By *Imirie & Smiley*
Attorneys Feb. 6, 1968  F. VANICH  3,367,074
METHOD FOR ERECTING PREFABRICATED BRIDGES OF CONCRETE, AND
BRIDGE ERECTED BY SAID METHOD
Filed March 17, 1964  5 Sheets-Sheet 5
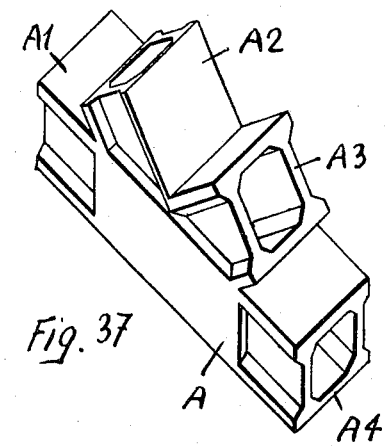
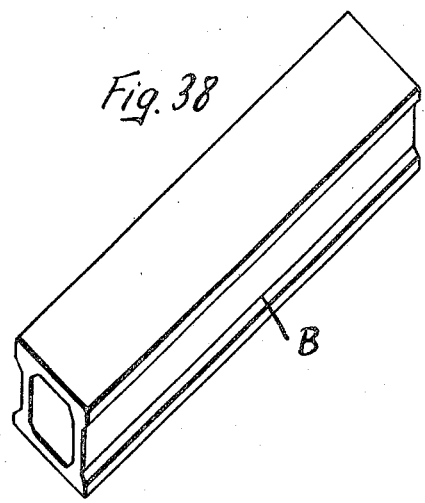
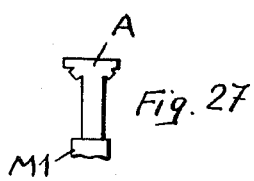
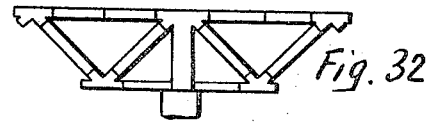
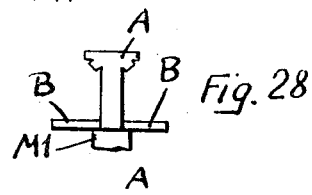
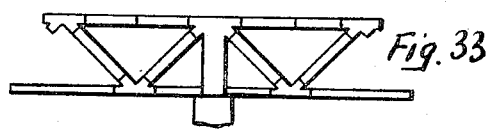
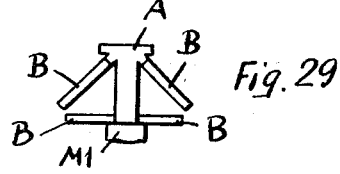
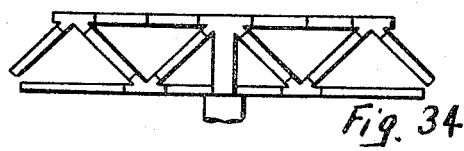
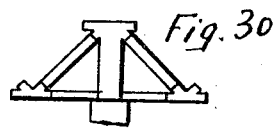
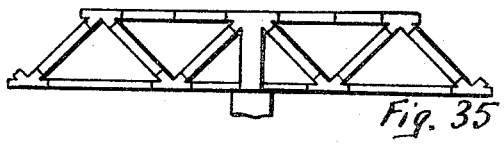
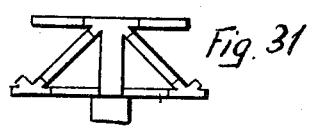
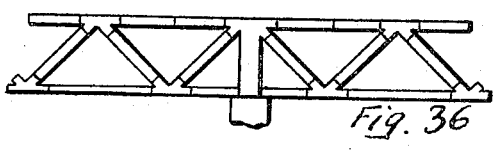
Inventor
FRANCESCO VANICH
By Imirie + Smiley
Attorneys United States Patent Office 3,367,074
Patented Feb. 6, 1968

3,367,074
METHOD FOR ERECTING PREFABRICATED BRIDGES OF CONCRETE, AND BRIDGE ERECTED BY SAID METHOD
Francesco Vanich, 67 Via Chiodo, Spezia, Italy
Filed Mar. 17, 1964, Ser. No. 352,502
3 Claims. (Cl. 52—223)

This invention relates to a method for erecting prefabricated bridges or other structures of prestressed concrete and structures built by said method.

In a known method for erecting bridges from prefabricated concrete components, beams or girders are employed which have a length corresponding to the span between two supports and are laid with the aid of cranes or the like. However, bridges with larger spans carrying a road of great height above the valley bottom or water surface, cannot be built or can only be built with great difficulty by such known method. In addition, it is necessary to employ large and heavy machinery, and the transport of the long and bulky prefabricated beams to the erection site can also frequently cause difficulties.

According to another known method of erecting prefabricated concrete bridges, centring or trestle centring of solid construction and full span is employed, to carry the prefabricated parts of the entire bridge, or at least of each bridge section between two supports, during assembly of the bridge. The erection of a solid, full-span, centring frame however entails considerable expenditure on materials and labour.

The object of the invention is to eliminate these shortcomings of the known methods, and to enable bridges of optional span and height without employing a robust, full-span centring frame.

Another object of the invention is to assemble the truss or latticework of the prefabricated bridge step by step by the connection of one or more prefabricated concrete components in each case involving coupling the same with the bridge section already produced by means of tensioning rods, the bridge section obtained after every erection stage forming a continuous whole.

In another object of the invention, the assembly of the bridge latticework is started appropriately on an intermediary or central support and the latticework grows step by step from this support and as symmetrically as possible on either side across the corresponding bridge gaps, i.e. as far as the next support or until the latticework sections growing towards each other from two supports meet in the middle of the corresponding bridge gap at which they are linked to each other.

In yet a further object of the invention positioning and fastening of the prefabricated concrete parts of the bridge latticework added in each erection stage may be performed with the aid of relatively small and preferably mobile centring extendable according to erection progress, or by employing in-front building methods, e.g. with the aid of a projecting platform or the like in front of the bridge section already erected.

The fastening of the prefabricated concrete parts freshly added during each erection stage to the bridge section already erected, is preferably performed only by means of the tensioning rods, i.e. the added prefabricated concrete parts are tensionally coupled in the dry state with the bridge section already erected, the contact faces of the different prefabricated concrete parts made to mate with each other and firmly pressed against each other by tensioning transmitting the bending moments which occur, as well as the transverse and thrust forces, in wholly reliable manner owing to the satisfactory friction bonding.

The tensioning rods required to connect the prefabricated concrete parts added in each instance may during each erection stage be drawn through the newly added prefabricated concrete parts and through the bridge section already erected, as well. It is also possible however, to lay all the tensioning rods in each bridge section during its erection, meaning all those which must according to static requirements be present in the corresponding bridge section after completion of the bridge, some of these rods being tensioned and employed to connect the newly added prefabricated concrete parts, whereas the other tensioning rods extend without tensioning and are connected to the tensioning rods inserted during the next erection stages. If this method of erection is employed, the tensioning rods fitted during each erection stage may not be inserted into the prefabricated concrete parts until after these have been placed in position, or they may already have been inserted in these prefabricated concrete parts in the unstressed state, during the production of the latter.

The method according to the invention renders it possible to construct bridges having supporting structures of optional nature, in particular having solid-web or hollow box section longitudinal beams, as well as latticework beams. The form of the individual prefabricated concrete parts and the manner in which they are joined together, are not crucial, and may be chosen at will. In particular, the prefabricated parts as such may be made of simple reinforced concrete or of prestressed concrete.

A major advantage of the erection method resides in that relatively small prefabricated concrete parts are used which render it unnecessary to employ unwieldy building machinery and are more easily transported moreover, may be employed for step by step assembly of the prefabricated concrete bridge.

A further object of the invention is to provide an appropriate form of construction of a prefabricated concrete bridge, in which the supporting structure comprises transverse beams of flat, frame or lattice design, and longitudinal box-section beams, at least two longitudinal beams parallel to each other and positioned at a distance from each other, being firmly clamped between every two transverse beams by means of tensioning rods disposed in the sides of the longitudinal beams and anchored in the transverse beams.

Additional features and advantages of the invention will emerge from the following description of two prefabricated bridges of prestressed concrete built according to the method of the invention.

FIGURES 1 to 14 in diagrammatical elevation show the consecutive erection stages employed in erecting a prefabricated concrete bridge using hollow box-section beams, FIGURE 15 is a cross-section through the carrying structure of the bridge, FIGURES 16 to 19 are perspective views of the prefabricated concrete parts used to assemble the bridge, FIGURE 20 shows a diagrammatic longitudinal section of the bridge, with the tensioning rods used to connect the prefabricated concrete parts newly added at each erection stage. A number of the tensioning rods incorporated is shown moreover in this figure below the position actually assumed in the supporting structure of the bridge, FIGURES 21, 22 and 23 show in diagrammatic enlarged plan view, sideview and view from below, a number of the tensioning rods used to connect the prefabricated concrete parts newly added in each instance, FIGURE 24 in cross-section shows the position of the different tensioning rods, FIGURES 25 and 26 in section show the anchoring of a tensioning rod and the connection between two tensioning rods, FIGURES 27 to 36 in diagrammatic elevation show the consecutive erection stages in the assembly of a latticework bridge, and FIGURES 37 and 38 are perspective views of two prefabricated concrete parts employed to assemble the latticework bridge according to FIGURES 27-36.

The prefabricated concrete bridge shown in FIGURES 1 to 26 is devised to carry a roadway and has a central span and two shorter end spans. The two middle supports are marked M1 and M2, and the end supports are marked E1 and E2. The supporting structure of this bridge is assembled from prefabricated parts which may as such be made of reinforced concrete or of prestressed concrete. The prefabricated concrete parts employed are shown in FIGURES 16 to 19 and consist of a transverse beam Q, a longitudinal beam L and carriageway slabs or plates F, F1. The transverse beam Q is made in the form of a flat frame or lattice beam. By contrast, the longitudinal beam L is constructed in the form of a hollow box-section beam. The bridge structure assembled from these prefabricated elements Q, L, F, F1, comprises several transverse beams Q disposed at a distance from each other, and longitudinal beams L mounted between these transverse beams Q. Two or more longitudinal beams L spaced apart and running parallel to each other, may be disposed between every two transverse beams Q. The assembly of transverse beams Q and longitudinal beams L mounted therebetween, is firmly pressed and held together longitudinally of the bridge by tensioning rods S. The tensioning rods S are mounted in the sides of the longitudinal box-section beams L and passed through or anchored in the transverse beams Q. The clamping action is performed without the intercalation of mortar, the plane end faces of the longitudinal beams L fitting in full area contact against the corresponding plane lateral faces of the transverse beams Q. A perfectly adequate form of dry friction bracing between the transverse and longitudinal beams is thereby accomplished.

To establish satisfactory bracing between the prefabricated concrete parts, it is particularly important that their contact faces should mate with each other in full area contact throughout, e.g. being plane and smooth. This may be accomplished during the production of these prefabricated concrete parts by employing mould boxes the sides of which are correspondingly accurate, smooth and plane. The contact faces of the prefabricated concrete parts may moreover be smoothed after setting by means of milling or grinding machines or the like. It is also possible finally, during the assembly of the bridge, i.e. during the fitting of the prefabricated concrete parts, to endow their mating contact faces with a thin cover, coating or the like, of synthetic material. The layer of synthetic material thus formed counteracts all the residual roughness and creates a contact area which is smooth and plane.

The assembly of this prefabricated concrete bridge is performed in the step by step method and preferably starts from a central support, e.g. from the left-hand central support M1 in FIGURES 1 to 14. As shown in FIGURE 2 in particular, a base unit consisting of a transverse beam Q0 together with the ambilaterally adjacent longitudinal beams L1 and their adjacent transverse beams Q1, is first mounted in position over the support M1. These prefabricated parts are joined to each other with the aid of the bent tensioning rods S1 and of the straight tenisoning rods S2, and form a base unit which is a cohesive whole. The arrangement of the tenisoning rods is seen in FIGURES 20 to 24 in particular. The tensioning rods S1 are anchored in the two transverse beams Q1 at the points V1 and the tensioning rods S2 at the points V2.

In the next erection stage, symmetrical extension of the base unit is effected by the longitudinal beams L2 and one adjacent transverse beams Q2 in each case, being brought into abutment on either side against the base unit bridge section Q, L1, Q1, already produced, and are connected to the bridge section already produced, by means of the bent tensioning rods S3 and of the straight tensioning rods S4. The tensioning rods S3, S4 are passed through the bridge section already produced, and are anchored in the transverse beams Q2 at the points V3 and V4 respectively. The bridge section Q0, L1, Q1, L2, Q2 thus completed again forms of cohesive whole.

The erection of the supporting structure of the bridge is continued in this manner by placing in position on both sides a set of longitudinal beams L and one transverse beam Q in abutment against the bridge section already produced, and by connection of the newly added longitudinal and transverse beams L and Q respectively with the aid of tensioning rods S, until the supporting structure reaches the left-hand end support E1 (see FIGURE 5). The supporting structure of the bridge is then extended in one direction only, i.e. towards the right in FIGURES 5 to 14, until it reaches the other central support M1 and subsequently the other end support E2.

The assembly of the supporting structure of the bridge may be performed with the aid of relatively small centring frames G1, G2, which primarily serve the purpose of carrying the longitudinal beams L and transverse beams Q newly added for each erection stage, until their final tensioning and connection with the bridge section already produced. In the example of construction shown, two such assembling frames G1, G2 are employed for example, which are erected at both sides of the central support M1, being the starting point for the assembly of the supporting structure of the bridge, as seen in FIGURES 1 and 2 in particular. The one assembling frame G1, which fills the lateral gap of the bridge between the central support M1 and the end support E1, is erected—after this lateral gap has been bridged over—in the opposite lateral gap M2–E2, as apparent from FIGURES 7 to 13 in particular. By contrast, the other assembling frame G2 is moved forward in the central bridge gap towards the other central support M2 as shown in FIGURES 3 to 10 in particular.

The supporting structure of the bridge can grow cantilever-fashion across the central bridge gap as far as the next central support M2, i.e. the bridge section completed after each erection stage is essentially stable statically and at least self-supporting. In the case of greater spans, and especially with small or moderate bridge heights, the travelling centring frame G2 employed for assembly may from a definite overhang of the bridge section produced also serve as an auxiliary support for the supporting structure of the bridge until the next solid support M2 is reached, and until the whole bridge has been assembled, as shown for example in FIGURES 7 to 12. What is important however in both cases, i.e. according to the unsupported erection method, as well as when employed a fixed or travelling auxiliary support, is that the bridge section completed after each erection stage, i.e. after each addition of other prefabricated concrete parts L, Q, should form a cohesive whole which is equivalent to a bridge section erected in monolithic manner.

It is also possible on the other hand not to employ any centring frame for the assembly of the bridge, and to assemble the supporting structure of the bridge in self-supporting cantilever-fashion, i.e. placing the longitudinal and transverse beams L and Q newly added at each erection stage in position while using the bridge section already produced and statically self-supporting, as a base. To this end, the freestanding extremity of the bridge section already produced may carry a projecting mounting platform, which carries the newly added longitudinal and transverse beams L and Q during their assembly and until their final clamping. After every erection stage, this mounting platform is moved forward in front of the newly produced bridge section and may appropriately be constructed in the form of a truck running on rails, or the like.

It is evident that it is possible to start the assembly of the supporting structure of the bridge at the same time, at both central supports M1, M2. The two bridge sections then grow symmetrically towards each other across the central bridge gap and meet in the middle of this gap, where they are connected to each other, e.g. equally with the aid of tensioning rods an/or of concrete cast in situ. In this case too, the bridge sections growing towards each other may be produced with the aid of small mobile centring frames i.e. assembling frames and/or auxiliary supports, or cantilever-fashion.

The tensioning rods S employed to connect the prefabricated longitudinal and transverse beams L and Q newly added for each erection stage, may be of optional construction and disposition. They may for example, in manner known per se, consist of a single steel rod T and a tubular casing H, the stressing duct K formed between the steel rod T and the casing H being filled after tensioning with cement mortar forced thereinto (see FIGURE 25). The anchoring points V of the tensioning rods S in the corresponding transverse beams Q may equally be of optional construction, e.g. in the form of bell, plate or cone anchoring points. An appropriate method of anchoring the tensioning rods is illustrated in FIGURE 25.

Especially if they extend along a curve, the tensioning rods S may already be included in the prefabricated longitudinal beams L during the production of the latter, in the unstressed state, and may be connected to each other after incorporation of the longitudinal beams, or passed through the adjacent transverse beams Q, and tensioned and anchored. As shown in FIGURES 22 and 26 in particular, the bent tensioning rods S1 used in the assembly of the longitudinal beams L1 and transverse beams Q0, Q1, each comprise two part-rods S1' and S1''. These part-rods S1' and S1'' are incorporated in the unstressed state in the opposed longitudinal beams L1 during their manufacture. After the assembly of the first bridge section formed by the longitudinal beams L1 and the transverse beams Q0, Q1 over the central support M1, the unattached extremities of the part rods S1', S1'' pointing towards each other are passed through the central transverse beam Q0 and are firmly joined together in its region in manner known per se, e.g. with the aid of a threaded sleeve W with intercalation of a ball C, as shown in FIGURE 26. This produces an uninterrupted tensioning rod S1, the outer extremities of which are passed through the corresponding transverse beams Q1 and anchored therein at the points V1.

The straight tensioning rods S2 required during the initial erection stage to connect the longitudinal beams L1 and the transverse beams Q0, Q1, may be by contrast drawn through the tubular casings H incorporated in the prefabricated parts after the latter have been laid in position, and may then be tensioned and anchored in the adjacent transverse beams Q1.

The bent tensioning rods S3 fitted during the next erection stage, which serve the purpose of connecting the newly added longitudinal and transverse beams L2, Q2 with the bridge section Q0, L1, Q1 already produced, each comprise three part-rods S3', S3'''. The outer part-rods S3' and S3'' are curved and are incorporated in the unstressed state in the corresponding longitudinal beams L2 during the production of the latter. The central part-rod S3''' however extends rectilinearly and, after the erection of the preceding bridge section, is drawn through the longitudinal and transverse beams L1, Q0, Q1 forming the said section. After the newly added longitudinal and transverse beams L2, Q2 are placed in position, the central straight part-rod S3''' is joined to the two outer part-rods S3' and S3'' in the region of the transverse beams Q1, e.g. with the aid of threaded sleeves W, and the uninterrupted tensioning rod S3 thus obtained is tensioned and anchored in the transverse beams Q2 by means of the anchoring devices V3.

It is evident that it is possible to form even straight tensioning rods S multisectionally, and after their insertion into the bridge section already produced and/or into the longitudinal beams to be secured thereto, to interconnect them.

The carriageway slabs or plates F, F1 may equally and progressively be laid in each case after fitting in position another set of longitudinal beams L and terminal transverse beam Q, being connected to each other and to the longitudinal beams L say by means of concrete cast in situ, and resulting in satisfactory reinforcement of these beams when the latter are tensioned. It is possible however not to employ prefabricated concrete slabs or plates F, F1 in producing the carriageway, which latter may then be cast as a whole in situ on the supporting bridge structure.

In the case of the example shown in FIGURES 27 to 37, the prefabricated concrete bridge is constructed in the form of a latticework bridge. Each lattice beam is formed of prefabricated junction or nodal parts A and prefabricated rectilinear parts B, which may as such be produced from reinforced concrete or prestressed concrete. The straight prefabricated parts B are of different length and are made in the form of hollow box-section beams. The prefabricated nodal or junction part A is of corresponding design and has projections A1, A2, A3, A4, against which the end faces of the prefabricated straight beams B bear with full-area contact.

In this case too, the supporting bridge structure of the lattice design is assembled step by step by placing in position additional prefabricated straight and nodal parts A and B in each instance, and by connecting the newly added prefabricated concrete parts with the bridge section already produced by means of tensioning rods. FIGURES 27 to 36 show diagrammatically the consecutive erection stages in the assembly of a bridge section over a central support M1. The prefabricated latticework grows symmetrically and self-supported from both sides of the central support M1 across the corresponding bridge gaps until it meets the latticework section which may have been started over the next support, being joined to the same by means of tensioning rods and/or by means of concrete cast in situ.

It is possible moreover in both examples of construction described, to incorporate auxiliary tensioning rods, e.g. to assure the creep strength and/or breaking strength of the bridge section completed after each erection stage, and to remove them after completion of the bridge. Such auxiliary tensioning rods may be disposed within the box-section shaped prefabricated parts L and B. These box-section shaped prefabricated parts L, B may moreover also be equipped with reinforcement after assembly of the bridge, and be filled with concrete cast in situ. After the whole bridge has been assembled, and during its assembly, the tensioning rods S which hold together the separate prefrabricated parts, must be restressed as a rule. The anchoring points V of the tensioning rods S must therefore be easily accessible, e.g. through special apertures left in the separate prefabricated parts. To summarise, it is possible in the case of both examples of construction described, to produce bridges of different length, spans and carrying capacity from the same prefabricated concrete parts Q, L, F, F1 respectively A, B.

I claim:
1. A prefabricated concrete bridge comprising:
    a bridge supporting structure including transverse beams disposed in pairs;
    the transverse beams including substantially flat frame beams and lattice-shaped beams;
    at least two longitudinal beams arranged in spaced apart, substantially parallel relation to one another;
    the longitudinal beams being securely clamped between the pairs of transverse beams;
    tensioning rods operatively related to the longitudinal beams and anchored to the transverse beams; and
    prefabricated carriage-way slabs mounted between the longitudinal beams.

2. In the method of erecting a bridge between end supports, which includes the steps of:

erecting an intermediate support spaced from and aligned between end supports, positioning assembly frames on either side of and adjacent to said interemdiate support in alignment with said end and intermediate supports, positioning a first prefabricated lateral beam in transverse direction with respect to said alignment direction and supporting it on said intermediate support, said first lateral beam having contact surfaces on either side thereof, positioning a pair of spaced, parallel prefabricated longitudinal beams on each of said assembly frames in end-abutting relation to said first lateral beam, the longitudinal beams having contact surfaces at their ends, positioning second and third lateral beams on said assembly frames in abutting relation to the free ends of each pair of longitudinal beams, said second and third lateral beams having contact surfaces on either side thereof, joining said second and third lateral beams and urging them together to compressively sandwich said longitudinal beams and said first lateral beams therebetween, whereby to form an integral and self-supporting base unit, extending the opposite ends of said base unit by joining fourth and fifth lateral beams thereto with additional pairs of longitudinal beams interposed between the fourth and fifth lateral beams and the respective second and third lateral beams, said fourth and fifth lateral beams having contact surfaces on either side thereof and said additional longitudinal beams having contact surfaces at their ends, and joining and urging said fourth and fifth lateral beams together to sandwich said base unit and said additional longitudinal beams therebetween, whereby to form an integral and self-supporting symmetrically extended unit containing said base unit centrally thereof, and repeating the symmetrical extension process successively to form integral and self-supporting extended unit until the gap between said intermediate support and one of said end supports is bridged.

3. In the method according to claim 2 which includes applying a layer of synthetic material to the contact faces of the longitudinal beams and the lateral beams, whereby compression stresses are distributed evenly throughout the contacting areas.

References Cited

UNITED STATES PATENTS

| 768,702 | 8/1904 | Strauss | 52—174 X |
| 731,595 | 6/1903 | Mueser | 52—174 |
| 2,963,764 | 12/1960 | Finsterwalder | 52—174 X |
| 3,145,502 | 8/1964 | Rubenstein | 52—309 X |

FOREIGN PATENTS

| 642,128 | 6/1962 | Canada. |
| 930,111 | 7/1963 | Great Britain. |
| 971,507 | 7/1950 | France. |

OTHER REFERENCES

Engineering News-Record, T.A. E61, Apr. 8, 1954, pp. 57–58.

1,134,407 Polensky et al., 8/1962 German Printed Publ.

1,140,594, Daube, 12/1962, Germany Printed Publ.

FRANK L. ABBOTT, *Primary Examiner.*

ALFRED C. PERHAM, *Examiner.*